United States Patent
Pereira

(10) Patent No.: US 10,185,464 B2
(45) Date of Patent: Jan. 22, 2019

(54) PAUSING TRANSIENT USER INTERFACE ELEMENTS BASED ON HOVER INFORMATION

(71) Applicant: Microsoft Technology Licensing, LLC, Redmond, WA (US)

(72) Inventor: Alexandre Pereira, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 149 days.

(21) Appl. No.: 14/724,561

(22) Filed: May 28, 2015

(65) Prior Publication Data

US 2016/0349959 A1 Dec. 1, 2016

(51) Int. Cl.
*G06F 3/0481* (2013.01)
*G06F 3/0484* (2013.01)
*G06F 3/0488* (2013.01)

(52) U.S. Cl.
CPC ........ *G06F 3/04817* (2013.01); *G06F 3/0481* (2013.01); *G06F 3/0488* (2013.01); *G06F 3/04812* (2013.01); *G06F 3/04842* (2013.01)

(58) Field of Classification Search
CPC ............. G06F 3/04817; G06F 3/04812; G06F 3/0481; G06F 3/0488; G06F 3/04842
See application file for complete search history.

(56) References Cited

U.S. PATENT DOCUMENTS

| 8,099,664 | B2 | 1/2012 | Kureshy et al. |
| 8,255,836 | B1 | 8/2012 | Gildfind |
| 8,508,347 | B2 | 8/2013 | Pihlaja |
| 8,614,693 | B2 | 12/2013 | King et al. |
| 2009/0300475 | A1* | 12/2009 | Fink ..................... G06F 17/3082 715/230 |
| 2010/0001953 | A1* | 1/2010 | Yamamoto ............ G06F 3/0346 345/158 |
| 2010/0004048 | A1* | 1/2010 | Brito ................... G07F 17/3265 463/20 |

(Continued)

FOREIGN PATENT DOCUMENTS

| EP | 2659341 A2 | 11/2013 |
| WO | 2015038840 A1 | 3/2015 |

OTHER PUBLICATIONS

Lu, et al., "Gesture Avatar: A Technique for Operating Mobile User Interfaces Using Gestures", In Proceedings of CHI Conference on Human Factors in Computing Systems, May 7, 2011, 10 pages.

(Continued)

*Primary Examiner* — Justin R. Blaufeld
(74) *Attorney, Agent, or Firm* — Workman Nydegger

(57) ABSTRACT

Embodiments are directed to using hover information to pause transient user interface features. In one scenario, a computer system detects the presence of an object at or near the display surface of the computer system. The computer system identifies the location of the object relative to the display surface and determines, based on the identified location of the object, where the object will contact the display surface. The computer system also identifies transient user interface elements that are being displayed where the object is determined to contact the display surface and pauses the identified transient user interface elements.

21 Claims, 7 Drawing Sheets

(56) References Cited

U.S. PATENT DOCUMENTS

| | | | |
|---|---|---|---|
| 2011/0285665 A1* | 11/2011 | Matsumoto | G06F 3/044 |
| | | | 345/174 |
| 2012/0026113 A1 | 2/2012 | Kasahara et al. | |
| 2012/0120002 A1* | 5/2012 | Ota | G06F 3/044 |
| | | | 345/173 |
| 2012/0167146 A1* | 6/2012 | Incorvia | H04N 21/234318 |
| | | | 725/60 |
| 2012/0274547 A1 | 11/2012 | Raeber et al. | |
| 2012/0304065 A1* | 11/2012 | Cai | G06Q 30/06 |
| | | | 715/719 |
| 2012/0311494 A1 | 12/2012 | Laden et al. | |
| 2013/0219308 A1 | 8/2013 | Britton | |
| 2013/0222329 A1* | 8/2013 | Larsby | G06F 3/04883 |
| | | | 345/174 |
| 2014/0049517 A1 | 2/2014 | Soo et al. | |
| 2014/0089099 A1* | 3/2014 | Money | G06F 3/0485 |
| | | | 705/14.66 |
| 2015/0012815 A1 | 1/2015 | Devi et al. | |
| 2015/0058760 A1 | 2/2015 | Puthenveettil | |

OTHER PUBLICATIONS

Dzyre, Nels, "Hovering Controls—Samsung-Like Air Gesture Features for any Android Device", Published on: Jun. 6, 2014 Available at: http://www.hongkiat.com/blog/android-hovering-control-app/.

Samantha, "Control Your Device without Touch with Hovering Controls", Published on: Jun. 20, 2013 Available at: http://www.xda-developers.com/control-your-device-without-touching-it-with-hovering-controls/.

International Search Report and Written Opinion for PCT Application No. PCT/US2016/030620, dated Jul. 21, 2016.

International Preliminary Report of Patentability issued in PCT Application No. PCT/US2016/030620 dated May 8, 2017.

\* cited by examiner

PAUSING TRANSIENT USER INTERFACE ELEMENTS BASED ON HOVER INFORMATION

BACKGROUND

Mobile devices including smartphones, tablets and wearable devices have become commonplace in today's society. These devices provide many different kinds of functionality through applications and hardware components. These applications typically have a user interface (UI) that allows users to interact with the application. The UI may have static elements as well as transient elements that change over time. In some cases, the transient elements may change at times that are undesirable to users.

BRIEF SUMMARY

Embodiments described herein are directed to using hover information to pause transient user interface features. In one embodiment, a computer system detects the presence of an object at or near the display surface of the computer system. The computer system identifies the location of the object relative to the display surface and determines, based on the identified location of the object, where the object will likely contact the display surface. The computer system also identifies transient user interface elements that are being displayed where the object is determined to contact the display surface and pauses the identified transient user interface elements. Pausing the transient user interface elements makes the user interface more reliable, as the user is sure to contact the element he or she wishes to contact and achieve the intended result of that contact. This also makes the user interface more efficient, as the user does not have to undo actions mistakenly performed due to a sudden change in the transient user interface element.

In another embodiment, a computer system is provided which includes the following: a processor, a display, an object detector for detecting the presence of an object at or near the display surface of the computer system, a location identifying module for identifying the location of the object relative to the display surface, a trajectory determining module for determining the current trajectory of the detected object relative to the surface of the display, a contact point determining module for determining, based on the identified location of the object and further based on the determined trajectory of the object, a contact point where the object will contact the display surface, an identifying module for identifying transient user interface elements that are being displayed at the determined contact point on the display surface, and a pausing module for pausing the identified transient user interface elements.

In another embodiment, an alternative method is provided for using hover information to pause transient user interface features. A computer system detects the presence of an object at or near the display surface of the computer system, and identifies the location of the object relative to the display surface. The computer system further determines the current trajectory of the detected object relative to the surface of the display, and determines, based on the identified location of the object and further based on the determined trajectory of the object, a contact point where the object will contact the display surface. The computer system also identifies transient user interface elements that are being displayed at the determined contact point on the display surface, and pauses the identified transient user interface elements.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
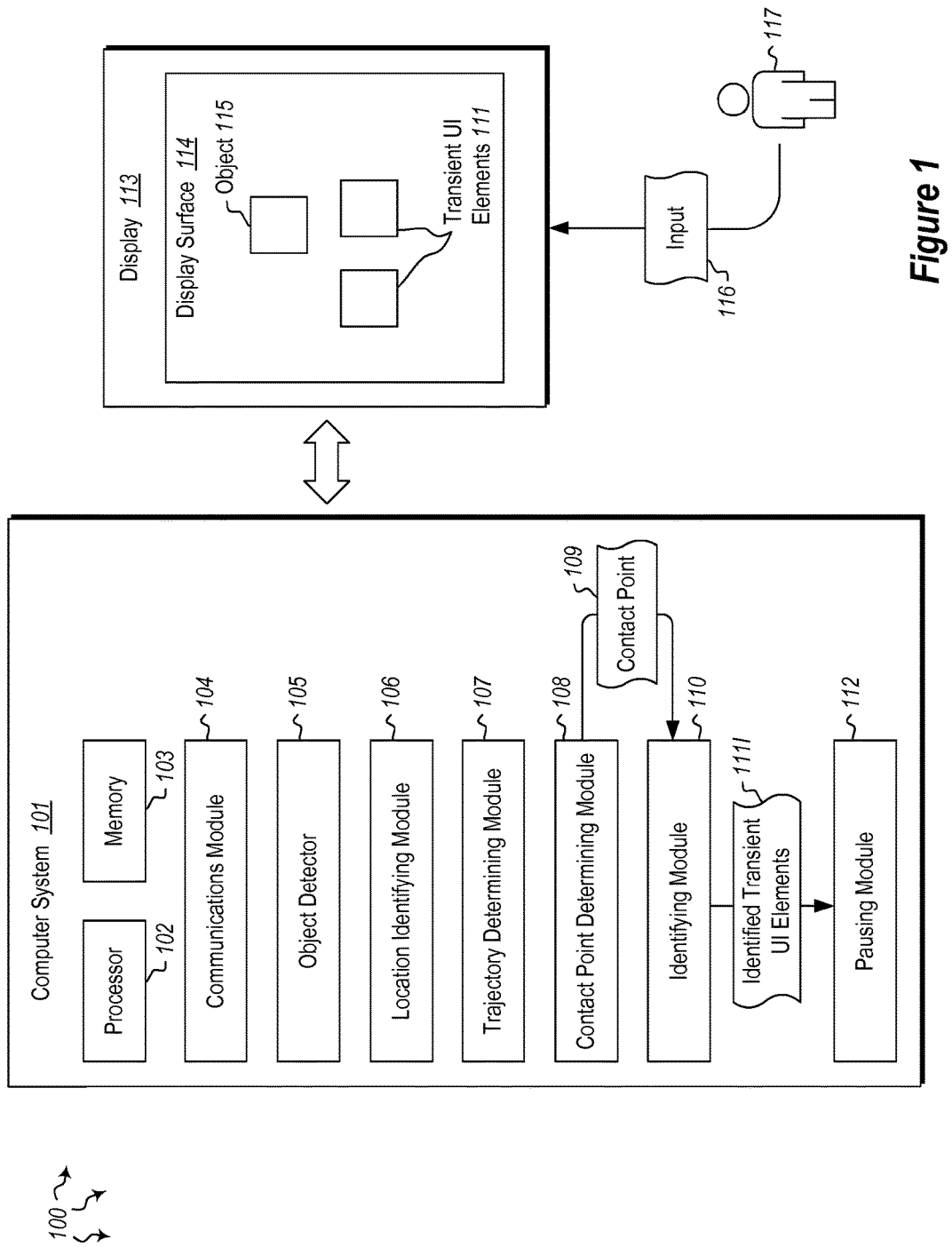
FIG. 1 illustrates a computer architecture in which embodiments described herein may operate including using hover information to pause transient user interface features.

Embodiments described herein are directed to using hover information to pause transient user interface features. In one embodiment, a computer system detects the presence of an object at or near the display surface of the computer system. The computer system identifies the location of the object relative to the display surface. In some cases, the computer system may determine, based on the identified location of the object, where the object will contact the display surface. This determination step, however, may be omitted in some cases. For example, the computer system may identify the presence of an object within a threshold distance from the surface of the display and pause all of the UI objects on the screen. Thus, in these cases, the computer system may pause the UI elements without determining where the object will contact the display surface.

The computer system also identifies transient user interface elements that are being displayed where the object is determined to contact the display surface and pauses the identified transient user interface elements. Pausing the transient user interface elements makes the user interface more usable and more reliable, as the user is sure to contact the element he or she wishes to contact and achieve the intended result of that contact. This also makes the user interface more efficient, as the user does not have to undo actions mistakenly performed due to a sudden change in the transient user interface element.

In another embodiment, a computer system is provided which includes the following: a processor, a display, an object detector for detecting the presence of an object at or near the display surface of the computer system, a location identifying module for identifying the location of the object relative to the display surface, a trajectory determining module for determining the current trajectory of the detected object relative to the surface of the display, a contact point determining module for determining, based on the identified location of the object and further based on the determined trajectory of the object, a contact point where the object will contact the display surface, an identifying module for identifying transient user interface elements that are being displayed at the determined contact point on the display surface, and a pausing module for pausing the identified transient user interface elements.

In another embodiment, an alternative method is provided for using hover information to pause transient user interface features. A computer system detects the presence of an object at or near the display surface of the computer system, and identifies the location of the object relative to the display surface. The computer system further determines the current trajectory of the detected object relative to the surface of the display, and determines, based on the identified location of the object and further based on the determined trajectory of the object, a contact point where the object will contact the display surface. The computer system also identifies transient user interface elements that are being displayed at the determined contact point on the display surface, and pauses the identified transient user interface elements.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computer systems. These computer systems are now increasingly taking a wide variety of forms. Computer systems may, for example, be handheld devices such as smartphones or feature phones, appliances, laptop computers, wearable devices, desktop computers, mainframes, distributed computer systems, or even devices that have not conventionally been considered a computer system. In this description and in the claims, the term "computer system" is defined broadly as including any device or system (or combination thereof) that includes at least one physical and tangible hardware processor, and a physical and tangible hardware or firmware memory capable of having thereon computer-executable instructions that may be executed by the processor. A computer system may be distributed over a network environment and may include multiple constituent computer systems.

As illustrated in FIG. 1, a computer system 101 typically includes at least one processing unit 102 and memory 103. The memory 103 may be physical system memory, which may be volatile, non-volatile, or some combination of the two. The term "memory" may also be used herein to refer to non-volatile mass storage such as physical storage media or physical storage devices. If the computer system is distributed, the processing, memory and/or storage capability may be distributed as well.

As used herein, the term "executable module" or "executable component" can refer to software objects, routines, or methods that may be executed on the computer system. The different components, modules, engines, and services described herein may be implemented as objects or processes that execute on the computer system (e.g., as separate threads).

In the description that follows, embodiments are described with reference to acts that are performed by one or more computer systems. If such acts are implemented in software, one or more processors of the associated computer system that performs the act direct the operation of the computer system in response to having executed computer-executable instructions. For example, such computer-executable instructions may be embodied on one or more computer-readable media or computer-readable hardware storage devices that form a computer program product. An example of such an operation involves the manipulation of data. The computer-executable instructions (and the manipulated data) may be stored in the memory 103 of the computer system 101. Computer system 101 may also contain communication channels that allow the computer system 101 to communicate with other message processors over a wired or wireless network. Such communication channels may include hardware-based receivers, transmitters or transceivers, which are configured to receive data, transmit data or perform both.

Embodiments described herein may comprise or utilize a special-purpose or general-purpose computer system that includes computer hardware, such as, for example, one or more processors and system memory, as discussed in greater detail below. The system memory may be included within the overall memory 103. The system memory may also be referred to as "main memory", and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

Embodiments described herein also include physical and other computer-readable media for carrying or storing computer-executable instructions and/or data structures. Such computer-readable media can be any available media that can be accessed by a general-purpose or special-purpose computer system. Computer-readable media or storage devices that store computer-executable instructions and/or data structures are computer storage media or computer storage devices. Computer-readable media that carry computer-executable instructions and/or data structures are transmission media. Thus, by way of example, and not limitation, embodiments described herein may comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the embodiments described herein. The data structures may include primitive types (e.g. character, double, floating-point), composite types (e.g. array, record, union, etc.), abstract data types (e.g. container, list, set, stack, tree, etc.), hashes, graphs or other any other types of data structures.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The embodiments herein may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the embodiments herein may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computer system. The computer system 101 includes modules for performing a variety of different functions. For instance, the communications module 104 may be configured to communicate with other computer systems. The communications module 104 may include any wired or wireless communication means that can receive and/or transmit data to or from other computer systems. The communications module 104 may be configured to interact with databases, mobile computing devices (such as mobile phones or tablets), embedded or other types of computer systems.

The computer system 101 may further include an object detector 105 that detects objects near the surface of a display. For instance, display 113 may be a touchscreen device with a display surface 114 that is sensitive to touch by objects such as fingers, styluses, or other objects. The object detector 105 may include hardware, software, firmware or a combination thereof to detect the objects. In some cases, the display surface 114 may be a capacitive surface that detects changes in capacitance in order to register a touch, tap, drag or other gesture. The display surface may be a resistive touch surface that responds to a change in resistance where an object is touching. Additionally or alternatively, the object detector 105 may implement a camera such as a front-facing camera installed on or embedded within the display surface 114. Other object detecting technology may also be used alone or in combination with the above-cited examples.

The object detector may be configured to detect the position of objects (e.g. 115) relative to the display surface along the x-axis, the y-axis as well as the z-axis. Indeed, in some cases, the object detector may be able to detect how far the object is away from the display surface 114, and may further detect when the object is moving toward the surface or moving away from the surface. Such changes along the z-axis may be detected through the change in capacitance or resistance (the change will be stronger when the object is closer to the surface) or may be detected using a camera or other object detecting hardware component.

The location identifying module 106 of the computer system 101 may determine where the object 115 currently is relative to the display surface 114 of the display 113. The trajectory determining module 107 may determine which direction the object 115 is moving in. This trajectory may be in two or three dimensions. When the user 117 provides input 116 on the display surface (e.g. via a finger or stylus), the contact point determining module 108 may determine a contact point 109 where the user 117 will most likely contact the surface 114. The contact point determining module 108 may use the determined current location and trajectory calculated by modules 106 and 107, respectively.

The inputs 116 received from the user 117 at the display surface 114 may be provided in relation to one or more user interface (UI) elements displayed on the display 113. For instance, a user may see transient or other UI elements 111 on the display surface and may wish to interact with those elements (e.g. to type a text message or browse the internet). Elements that are temporary or who's function, action, result, change over time or are only to be displayed for a short amount of time may be referred to as "transient" UI elements. In some cases, these transient UI elements may introduce usability issues as the elements may change or disappear shortly before they are selected by the user 117.

For example, when a user is typing, automatic suggestions may be provided to remove typos. As the user types, suggestions appear in a drop down or similar UI feature. These automatic suggestions may be subject to asynchronous re-ranking. As a result, the UI can change immediately prior or simultaneous to the user contact, which causes an accidental commit of an erroneous suggestion. Accordingly, embodiments herein determine when and where user is about to tap, and pause the transient UI elements in that region or on the whole screen to ensure that the UI remains static (i.e. it does not change position, state or function). This may increase the usability of touch screen devices, as users are prevented from erroneously selecting options they did not intend to select.

Many of today's smartphones, tablets, laptops and wearable devices have the ability to detect when an object is hovering over the device's display. The information related to the object (such as its distance from the screen, its trajectory, its intent to select an object, etc.) is referred to herein as hover information. The hover information thus includes an indication of where the user is likely to tap using a finger, stylus or other object. The object detector 105 of the computer system 101 may detect whether or not a finger is within some threshold distance from the surface 114 of the screen 113. More complex implementations may sample the hover distance information at some frequency, and may thus detect when a finger is moving closer to the screen. The contact point determining module 108 may then infer where the object will make contact. This detection step may also be configured to distinguish impending taps from other movements that fingers may have immediately above a touch screen (e.g. panning).

Once the computer system 101 determines that a tap or other touch is imminent, the pausing module 112 of the computer system may pause the transient UI elements 111 directly, or may signal to an operating system (OS) that the transient elements are to be paused (at least temporarily). As mentioned above, transient UI elements may be any elements of touchscreen GUI that change position and/or change state and/or change function in a manner that is asynchronous to the user input. The transient UI elements 111 may be paused individually or collectively and, at least in some cases, are only paused near the area the user contacted the display surface 114. It should also be noted that while the display 113 is shown as being separate from and connected to computer system 101, the display may be integrated directly into computer system 101 (such as with a smartphone or tablet). The concepts described above will be explained further below with regard to methods 200 and 800 of FIGS. 2 and 8, respectively.

Figure 2:
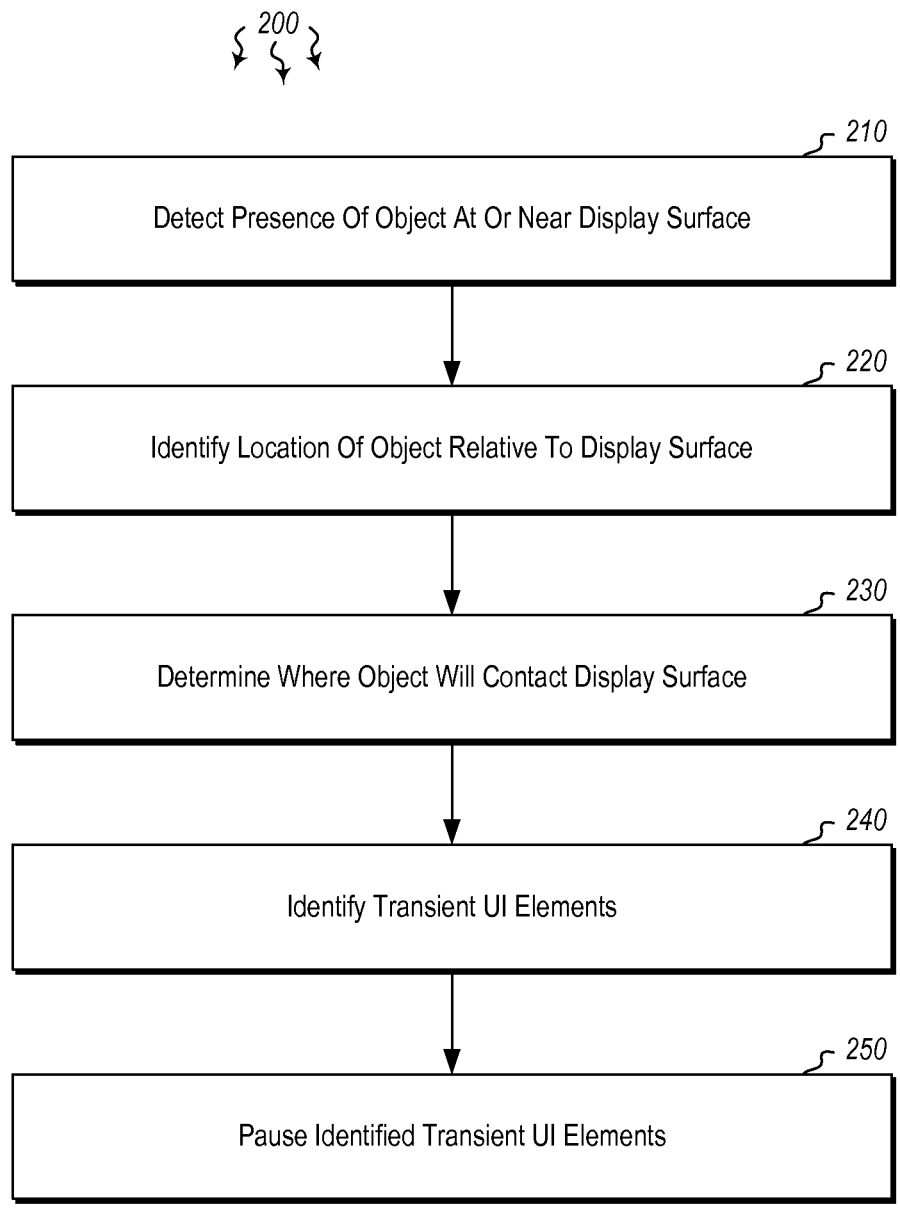
FIG. 2 illustrates a flowchart of an example method for using hover information to pause transient user interface features.
Figure 8:
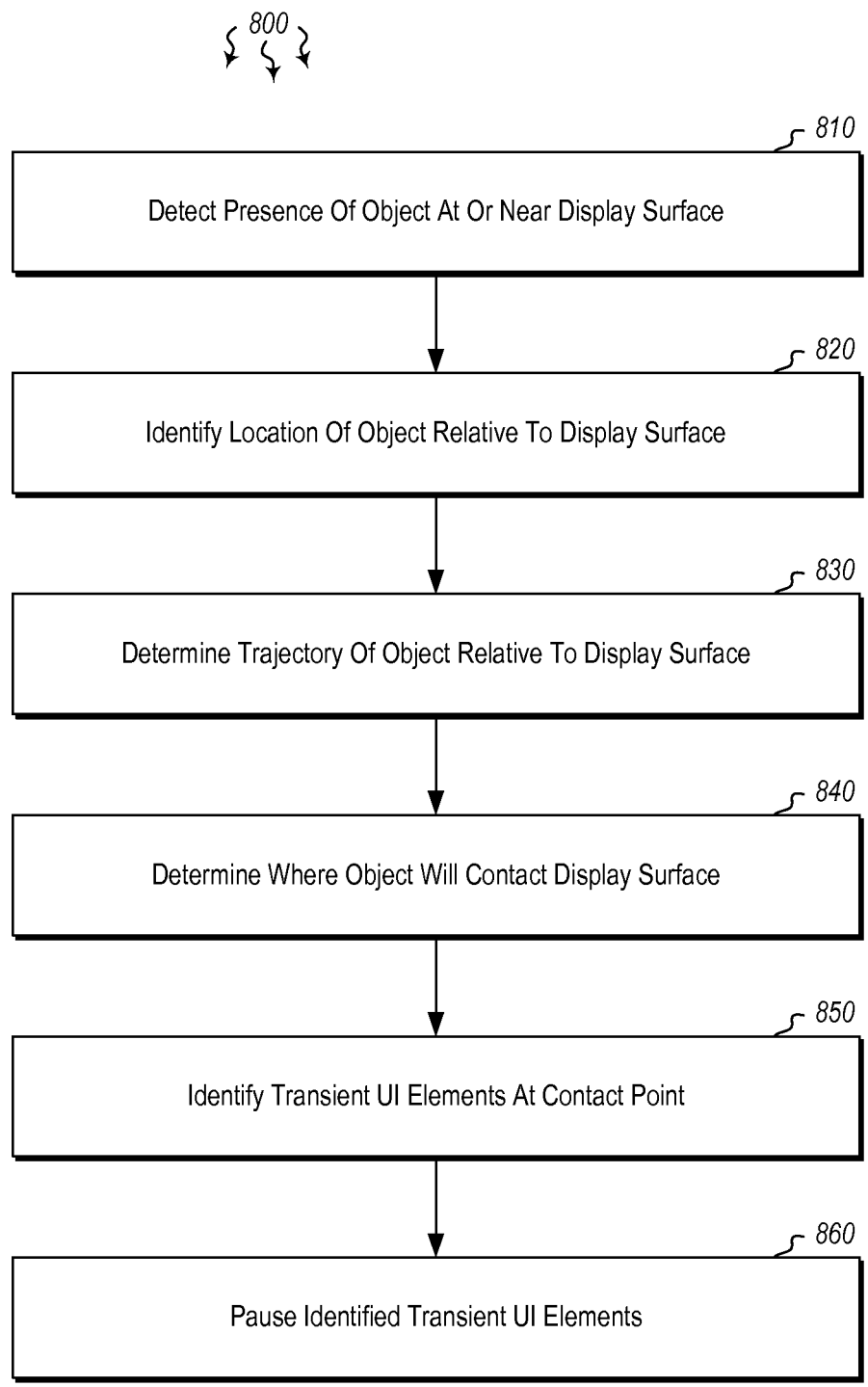
FIG. 8 illustrates a flowchart of an alternative example method for using hover information to pause transient user interface features.

In view of the systems and architectures described above, methodologies that may be implemented in accordance with the disclosed subject matter will be better appreciated with reference to the flow charts of FIGS. 2 and 8. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for using hover information to pause transient user interface features. The method 200 will now be described with frequent reference to the components and data of environment 100.

Method 200 includes detecting the presence of an object at or near the display surface of the computer system (210). For example, the object detector 105 of computer system 101 may detect the presence of object 115 near the surface 114 of the display 113. The object may be near the surface or may be in contact with the surface 114. The object may be substantially any item that could be used to control an interface displayed on the display 113.

Figure 3:
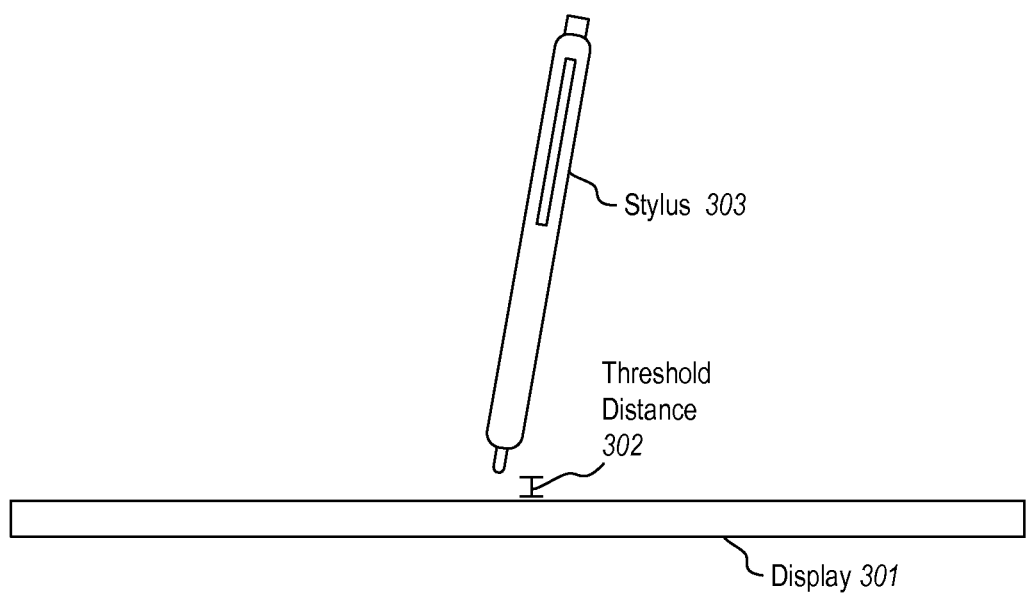
FIG. 3 illustrates an embodiment in which an object is detected relative to a device surface.

In some embodiments, the location identifying module 106 may determine that an object is near the surface of a display and pause without making any further determinations. For instance, the object detector 105 may detect the presence of object 115 near the surface 114 of display 113 and automatically pause all (or at least the transient) UI elements 403 on the screen. The pausing module 112 may pause these UI elements whether or not the location has been identified where the object will actually (or most likely) hit the screen. As shown in FIG. 3, a stylus 303 may be near a display 301 such as a tablet. Once the stylus 303 (or other object) is within a threshold distance 302 of the display 301, the pausing module 112 may automatically pause the UI elements shown on the display without making further determinations.

Method 200 further includes identifying the location of the object relative to the display surface (220) and determining, based on the identified location of the object, where the object will contact the display surface (230). The location identifying module 106 may identify the location of the object 115 relative to the display surface on the x-axis, y-axis and/or z-axis. In some cases, the trajectory determining module 107 may determine the trajectory of the object 115 relative to the display surface 114. The contact point determining module 108 may use the identified location and/or the identified trajectory to determine where the object is most likely to contact the surface 114.

Figure 4B:
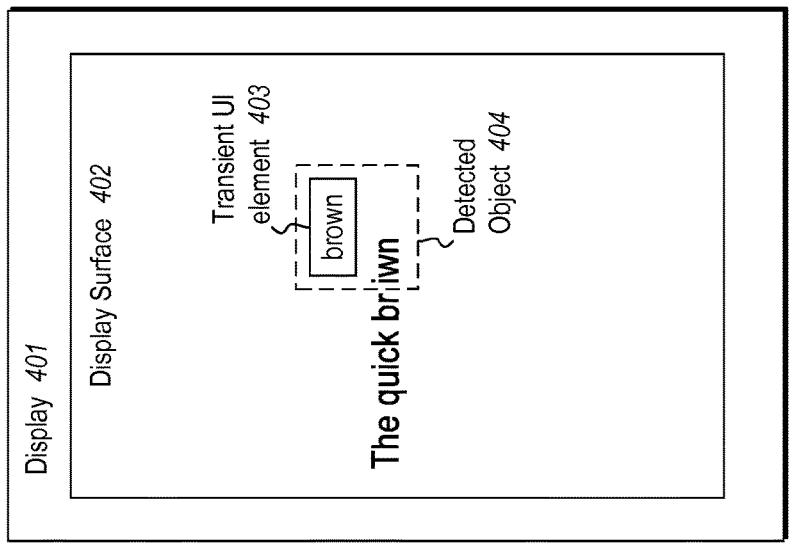
FIGS. 4A and 4B illustrate embodiments in which an object is detected relative to a device surface and a transient element is paused.
Figure 4A:
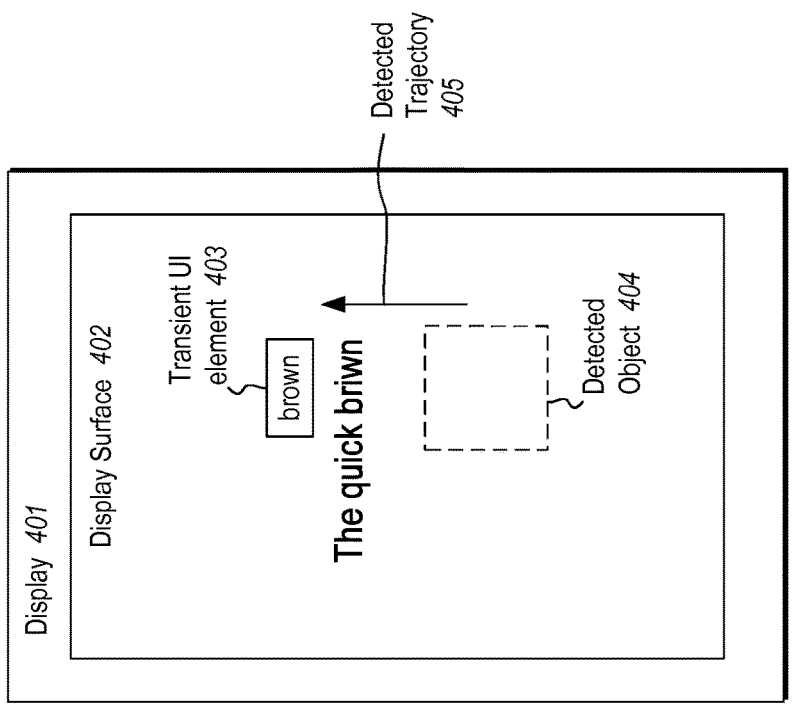

The current trajectory of the object 115 may be determined by identifying changes between x-axis coordinates, y-axis coordinates and z-axis coordinates. These changes may be monitored over time. For instance, the changes may be sampled at a certain frequency. The changes in capacitance, resistance or changes in depth as measured by a camera may be used to identify the object's current trajectory. For instance, as shown in FIG. 4A, a display 401 may have multiple UI elements including transient UI element 403. In this embodiment, the transient UI element is an autocorrect box that has been displayed above the word "briwn" which is misspelled. The autocorrect box has suggested the correct spelling of "brown". The object detector 105 of FIG. 1 may have detected the presence of object 404, and the trajectory determining module 107 may have detected the current trajectory 405 for the object. The detected object's current position is represented by the dotted line box. As shown in FIG. 4B, this dotted line box has moved positions, and is now over the transient UI element 403. As will be described further below, the pausing module 112 may pause the transient UI element 403 to ensure that it does not change before it is selected by the user.

Figure 5:
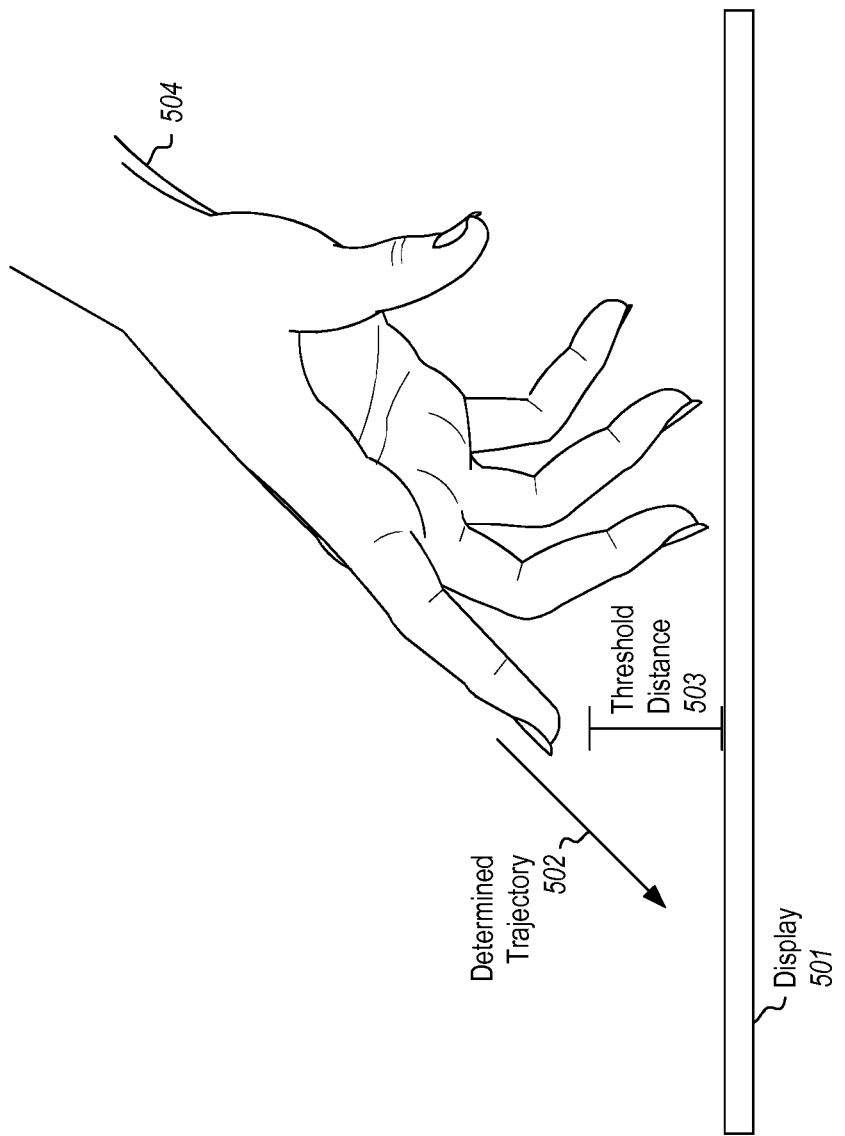
FIG. 5 illustrates a user's finger and a threshold distance within which the user's anticipated contact point will be determined.

In cases where the display surface 402 comprises a capacitance-based touchscreen, the z-axis coordinates may be determined by detecting changes in capacitance on the display surface. Detecting the z-axis coordinates of the object 404 may allow the computer system to determine when the object is merely hovering and when the object is actually going to touch the display surface. For instance, as shown in FIG. 5, a display 501 may detect when a user's hand or finger 504 is within a threshold distance 503 from the display surface. The threshold distance 503 may be a preconfigured distance indicating that the user or object is indeed going to touch the surface. The threshold distance 503 may be configured to be larger or smaller, depending on the determined trajectory 502 of the device.

For instance, if the trajectory 502 of the object is slow (i.e. the object is moving slowly toward the display), then the threshold distance 503 may be extended longer to ensure that the user isn't merely hovering over the surface. The longer threshold distance 503 may thus aid in removing false positives (i.e. cases where the user acts like they are going to touch the screen and do not actually touch it). The threshold distance 503 determination indicates when the object is within the threshold distance 503 from the display surface and, combined with a trajectory 502, can indicate with high likelihood whether the user intends to touch the display 501. Conversely, if the trajectory 502 of the object 504 is fast (i.e. the object is moving quickly toward the display), then the threshold distance 503 may be shortened to ensure that the movement is recorded as an intended touch, and is not removed as a potential false positive.

The trajectories may also be determined to be within (or outside of) a specified range. For example, the trajectory may be determined to be coming straight toward the display at a 90 degree perpendicular angle. Alternatively, the trajectory may be determined to be a glancing 20 degrees (where zero degrees would not contact the display (i.e. a hover)) or some other measurement. If the trajectory is determined to be more direct, the likelihood of contact with the display increases, whereas if the trajectory is determined to be less direct, the likelihood of contact with the display decreases.

Returning to FIG. 2, method 200 includes identifying one or more transient user interface elements that are being displayed where the object is determined to contact the display surface (240) and pausing the identified transient user interface elements (250). The identifying module 110 of FIG. 1 may identify transient UI elements (e.g. 111) that are being displayed on the display surface 114. In some cases, the identifying module 110 may identify all of the transient UI elements on the page, or may specifically identify those elements that are in the vicinity of the area where the user (or object) touched the display.

Figure 6:
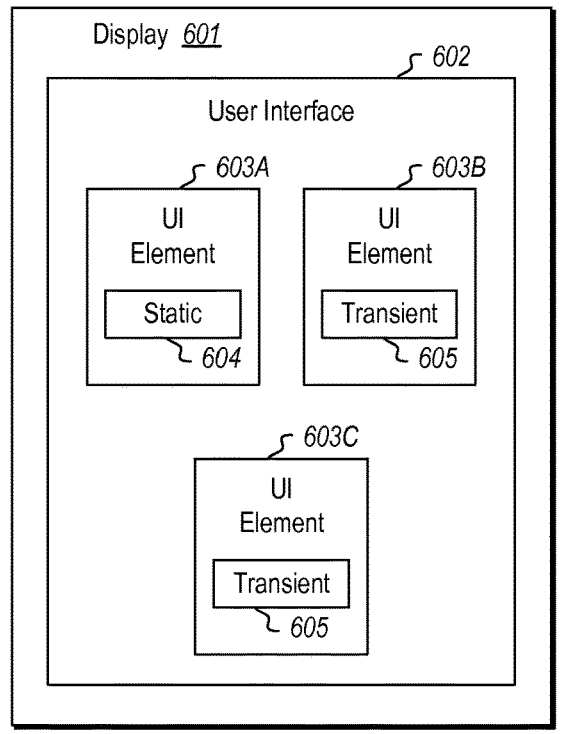
FIG. 6 illustrates an embodiment of a display that includes a user interface with multiple elements including both static and transient elements.
Figure 7:
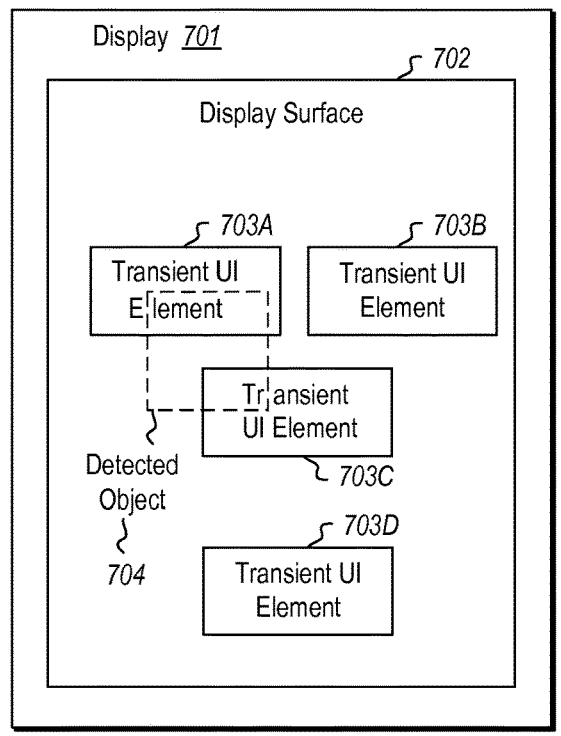
FIG. 7 illustrates an embodiment of a display in which an object is hovering over multiple transient user interface elements.

For example, as shown in FIG. 6, a display 601 may include a user interface 602 with multiple UI elements 603A, 603B and 603C. The UI element 603A is shown as a static element that has static properties 604, while UI elements 603B and 603C are transient elements that have transient properties 605. The user may touch the display 601 near the UI elements 603A-C, and the pausing module 112 of FIG. 1 may pause the transient elements 605 that are in the vicinity of the user's touch, while leaving the static elements alone. FIG. 7 illustrates a scenario with multiple transient UI elements 703A-D on display surface 702 of display 701. The detected object 704 may touch the display surface 702 at the location indicated by the dotted line. The dotted line overlaps transient UI elements 703A and 703C, but does not touch transient UI elements 703B or 703D. In some cases, only those UI elements that are actually touched (i.e. 703A and 703C) are paused, while in other cases, a broader range of UI elements may be paused. In such cases, element 703B may be paused in addition to elements 703A and 703C. Still further, in some cases, all of the transient UI elements may be paused when a touch or contact is detected. In those cases, all transient elements 703A-D would be paused upon detecting object 704 on the surface 702.

When transient UI elements are paused, they may be paused for a specified amount of time and then automatically unpaused at the end of the specified time. Thus, when the specified amount of time has been reached, the transient UI element may change as it normally would. In other cases, when transient elements are paused, they may be paused until a specified event occurs. Then, when the specified event occurs, the transient UI elements are unpaused and are free to change. In cases where the transient UI elements are paused until a specific event occurs, there may be a timeout in place that will automatically unpause the UI elements if a sufficiently long time has elapsed while waiting for the event to occur.

In some cases, each user interface element (or just the transient elements) may be tagged with a certain tag. Referring again to FIG. 6, each of the UI elements 603A, 603B and 603C may have a tag indicating its static or transient properties. UI element 603A may be tagged as a static element 604, while UI elements 603B and 603C may be tagged as transient elements 605. The flag may let the computer system 101 know which elements to pause when transient elements are to be paused. The transient UI elements may be paused by an application or by an operating system running on the computer system 101. Thus, in this manner, a user's input 116 may be detected and, based on the input, transient UI elements may be paused to ensure that the user selects the object or menu item they intended to select. This enables touchscreen GUIs to be more reliable and more accurately reflect the user's true intent.

FIG. 8 illustrates a flowchart of a method 800 for using hover information to pause transient user interface features. The method 800 will now be described with frequent reference to the components and data of environment 100.

Method 800 includes detecting the presence of an object at or near a display surface of the computer system (810). For example, the object detector 105 of computer system 101 may detect the presence of object 115 at or near the display surface 114 of display 113. The object's location, distance from the surface (along the z-axis), and current trajectory may be part of the hover information used to pause transient UI features. The hover information may further include an indication of what the object is (e.g. a finger vs. a stylus or other object).

The location identifying module 106 may identify the location of the object 115 relative to the display surface 114 (820), while the trajectory determining module 107 determines the current trajectory of the detected object relative to the surface of the display (830). Then, based on the identified location of the object 115 and further based on the determined trajectory of the object, the contact point determining module 108 determines a contact point where the object will contact the display surface (840). The identifying module 110 identifies one or more transient user interface elements that are being displayed at (or near) the determined contact point on the display surface (850) and, based on the determination, the pausing module 112 pauses the identified transient user interface elements (860).

In some cases, an application running on the computer system 101 may be configured to gather the hover information from hardware, firmware or software components of the computer system. The application may then further be used to identify transient user interface elements and pause those identified transient user interface elements. In other cases, an operating system running on the computer system 101 gathers the hover information from hardware, firmware or software and identifies transient UI elements and pauses those identified transient UI elements. Still further, the application and the OS may work together to identify the hover information, determine which UI elements are to be paused, and then pause the identified UI elements. Thus, in this manner, an application, an operating system, or both working together may be used to identify hover information and pause transient UI elements accordingly.

In one specific embodiment, a computer system is provided which includes the following components: a processor 102, a display 113, an object detector 105 for detecting the presence of an object 115 at or near the display surface 114 of the computer system, a location identifying module 106 for identifying the location of the object relative to the display surface, a trajectory determining module 107 for determining the current trajectory of the detected object relative to the surface of the display, a contact point determining module 108 for determining, based on the identified location of the object and further based on the determined trajectory of the object, a contact point 109 where the object will contact the display surface, an identifying module 110 for identifying transient user interface elements that are being displayed at the determined contact point on the display surface, and a pausing module 112 for pausing the identified transient user interface elements 111I. This computer system may be implemented to perform any of the embodiments described herein.

In some cases, the identifying module 110 of the computer system 101 identifies transient UI elements by looking for a transient UI tag associated with the element (e.g. in metadata associated with the UI element). In other cases, the identifying module 110 may identify transient UI elements by identifying those UI elements that have changed within a specified timeframe. For instance, if a UI element was not initially displayed as part of a UI, and then was displayed by the UI at a later time, the element may be identified as transient. Additionally or alternatively, if a UI element was initially displayed as part of a UI, and then changed (e.g. its text changed, or its graphics changed, or its appearance changed in some other form), then the element may be identified as a transient UI element. Thus, transient UI elements may be identified in a variety of different manners.

The transient UI elements may be identified at the outset (such as with metadata tags), or may be identified in real time once the object detector detects an object 115 near the surface of the display surface 114. In some cases, the object detector 105 detects that the object at or near the display surface 114 of the computer system 101 is a finger or a stylus. The location identifying module 106 may identify the current location of the object, and the trajectory determining module 107 may determine the object's current path and speed toward the display surface 114. The pausing module 112 may pause those UI elements that are determined to be transient.

In some cases, as is generally shown in FIG. 7, the pausing module 112 may pause those UI elements that are within a threshold distance of the detected object 115 on the display surface 114. In other cases, the pausing module 112 may pause each transient element that is being displayed on the display surface, regardless of where the transient elements are displayed on the display surface 114. In this manner, transient UI elements may be identified and paused at the detection of a touch or an impending touch or contact. Thus, methods, computer systems and computer program products are provided which use hover information to pause transient user interface features.

Claims Support: In one embodiment, a method is provided, implemented at a computer system that includes at least one processor and a display surface, for using hover information to pause transient user interface features. The method includes: detecting the presence of an object 115 at or near the display surface 114 of the computer system 101, identifying the location of the object relative to the display surface, determining, based on the identified location of the object, where the object will contact 109 the display surface, identifying one or more transient user interface elements 111 that are being displayed where the object is determined to contact the display surface, and pausing the identified transient user interface elements WI.

In the method, the identified transient elements are paused for a specified amount of time and are automatically unpaused at the end of the specified time. In some cases, the identified transient elements are paused until a specified event occurs and are automatically unpaused upon the occurrence of the specified event. In the method, determining where the object will contact the display surface further includes determining a current trajectory of the object and implementing the determined trajectory to determine where the object will contact the display surface. The current trajectory of the object is determined by identifying change between x-axis coordinates, y-axis coordinates and z-axis coordinates over time.

The display surface comprises a capacitance-based touchscreen, and the z-axis coordinates are determined by detecting changes in capacitance on the display surface. Determining where the object will contact the display surface further comprises determining when the object is within a threshold distance from the display surface. In some cases, the method further includes removing one or more false positive indications using the threshold determination indicating when the object is within a threshold distance from the display surface. Determining where the object will contact the display surface further comprises determining when the object is within a specified range of trajectories relative to the display surface.

In another embodiment, a computer system is provided which comprises: at least one processor 102, a display 113, an object detector 105 for detecting the presence of an object 115 at or near the display surface 114 of the display, a location identifying module 106 for identifying the location of the object relative to the display surface, a trajectory determining module 107 for determining the current trajectory of the detected object relative to the surface of the display, a contact point determining module 108 for determining, based on the identified location of the object and further based on the determined trajectory of the object, a contact point 109 where the object will contact the display surface, an identifying module 110 for identifying one or more transient user interface elements 111 that are being displayed at the determined contact point on the display surface, and a pausing module 112 for pausing the identified transient user interface elements 111I.

The identifying module that identifies transient user interface elements identifies those user interface elements that have changed within a specified timeframe. The detector detects that the object at or near the display surface of the computer system is a finger or a stylus. The pausing module pauses those identified transient elements that are within a threshold distance of the detected object on the display surface.

In another embodiment, a computer program product is provided for implementing a method for using hover information to pause transient user interface features. The computer program product comprises one or more computer-readable storage media having stored thereon computer-executable instructions that, when executed by one or more processors of a computer system, cause the computer system to perform the method, the method comprising: detecting the presence of an object 115 at or near a display surface 114 of a computer system display 113, identifying the location of the object relative to the display surface, determining the current trajectory of the detected object relative to the surface of the display, determining, based on the identified location of the object and further based on the determined trajectory of the object, a contact point 109 where the object will contact the display surface, identifying one or more transient user interface elements 111 that are being displayed at the determined contact point on the display surface, and pausing the identified transient user interface elements 111I. In some cases, an application running on the computer system gathers hover information from hardware, identifies transient user interface elements and pauses the identified transient user interface elements.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

I claim:

1. A method, implemented at a computer system that includes at least one processor and a display surface, for selectively pausing transient user interface elements displayed on the display surface in order to permit selection of a paused transient user interface element, the method comprising:

displaying on the display surface a plurality of separately selectable transient user interface elements, wherein the plurality of separately selectable transient user interface elements periodically change position, state or function as a result of continuous asynchronous re-ranking in response to user input;

detecting the presence of an object at or near the display surface of the computer system, wherein the object is associated with a user gesture;

identifying the location of the object relative to the display surface;

determining, based on the identified location of the object, a direction in which the object is moving;

at a point in time when the object is determined to be within a threshold distance of the display surface, identifying a subset comprising two or more but less than all of the separately selectable transient user interface elements, wherein the periodic change in position, state or function that occurs as a result of the continuous asynchronous re-ranking in response to user input occurs prior to the point in time when the object is determined to be within the threshold distance of the display surface;

once the object is within the threshold distance, without rearranging the identified subset of transient user interface elements, pausing the identified subset of separately selectable transient user interface elements so that they do not change position, state, or function for a specified time to allow a selection of at least one of the paused separately selectable transient user interface elements in response to the user gesture; and unpausing the paused transient user interface elements at the end of the specified time in the event no selection is made for any of the paused separately selectable transient user interface elements.

2. The method of claim 1, wherein pausing the identified subset of the separately selectable transient user interface elements for the specified time comprises pausing the identified subset of separately selectable transient user interface elements until a specified event occurs, after which the paused transient user interface elements are unpaused upon the occurrence of the specified event.

3. The method of claim 1, wherein determining which direction the object is moving in comprises determining a current trajectory of the object and based on the current trajectory determining a likely contact point where the object will contact the display surface.

4. The method of claim 3, wherein the current trajectory of the object is determined by identifying change between x-axis coordinates, y-axis coordinates and z-axis coordinates over time.

5. The method of claim 4, wherein the display surface comprises a capacitance-based touchscreen, and wherein the z-axis coordinates are determined by detecting changes in capacitance on the display surface.

6. The method of claim 3, wherein the likelihood of the contact point where the object will contact the display surface increases or decreases depending on whether the current trajectory is within or is outside of a specified range.

7. The method of claim 6, wherein the threshold distance is lengthened if the current trajectory indicates the object is moving slowly toward the display, and wherein the threshold distance is shortened if the current trajectory indicates the object is moving more rapidly toward the display.

8. The method of claim 1, wherein the some but not all paused separately selectable transient user interface elements are paused by an operating system running on the computer system.

9. The method of claim 1, wherein separately selectable transient user interface elements that are being displayed on the display surface each comprise a flag that identifies an interface element as a transient user interface element.

10. A computer system comprising a display, a memory containing executable instructions, and at least one processor which, when executing the executable instructions, cause the computer system to run an architecture which operates to selectively pause transient user interface elements displayed on the display surface in order to permit selection of a paused transient user interface element, and wherein the architecture of the computer system operates according to a method comprising:
- displaying on the display surface a plurality of separately selectable transient user interface elements, wherein the plurality of separately selectable transient user interface elements periodically change position, state or function as a result of continuous asynchronous re-ranking in response to user input;
- detecting at an object detector the presence of an object at or near the display surface of the display, wherein the object is associated with a user gesture;
- identifying at a location identifying module the location of the object relative to the display surface;
- determining at a trajectory determining module a current trajectory of the detected object relative to the surface of the display;
- based on the determined current trajectory and based on the identified location of the object relative to the display surface, determining at a contact point determining module a likely contact point where the object will contact the display surface;
- at a point in time when the object is determined to be within a threshold distance of the determined likely contact point on the display surface, identifying at an identifying module a subset comprising two or more but less than all of the separately selectable transient user interface elements that are being displayed on the display surface, wherein the periodic change in position, state or function that occurs as a result of the continuous asynchronous re-ranking in response to user input occurs prior to the point in time when the object is determined to be within the threshold distance of the display surface;
- without rearranging the identified subset of transient user interface elements, pausing with a pausing module the identified subset of separately selectable transient user interface elements so that they do not change position, state, or function, wherein the paused separately selectable transient user interface elements are located within a determined distance of the likely contact point, and wherein the paused separately selectable transient user interface elements are paused for a specified time to allow a selection of at least one of the one or more paused separately selectable transient user interface elements in response to the user gesture; and
- in response to completion of the user gesture, selecting at least one of the separately selectable transient user interface elements that has been paused.

11. The computer system of claim 10, wherein the paused separately selectable transient user interface elements are unpaused at the end of the specified time irrespective of whether the object was used to make a selection or not of one of the paused transient user interface elements.

12. The computer system of claim 10, wherein pausing the some but not all separately selectable transient user interface elements for the specified time comprises pausing the some but not all separately selectable transient user interface elements until a specified event occurs, after which the paused transient user interface elements are unpaused upon the occurrence of the specified event.

13. The computer system of claim 10, wherein the likelihood of the contact point where the object will contact the display surface increases or decreases depending on whether the current trajectory is within or is outside of a specified range.

14. The computer system of claim 13, wherein the threshold distance is lengthened if the current trajectory indicates the object is moving slowly toward the display, and wherein threshold distance is shortened if the current trajectory indicates the object is moving more rapidly toward the display.

15. A computer program product comprising one or more hardware storage devices having stored thereon computer-executable instructions that, when executed by one or more processors of a computer system, cause the computer system to perform a method for selectively pausing transient user interface elements displayed on the display surface in order to permit selection of a paused transient user interface element, the method comprising:
- displaying on the display surface a plurality of separately selectable transient user interface elements wherein the plurality of separately selectable transient user interface elements periodically change position, state or function as a result of continuous asynchronous re-ranking in response to user input;
- detecting the presence of an object at or near a display surface of a computer system display, wherein the object is associated with a user gesture;
- identifying the location of the object relative to the display surface;
- determining the current trajectory of the detected object relative to the surface of the display;
- determining, based on the identified location of the object and further based on the determined trajectory of the object, a likely contact point where the object will contact the display surface to select an interface element;
- at a point in time when the object is determined to be within a threshold distance of the determined likely contact point on the display surface, identifying a subset comprising two or more but less than all of the separately selectable transient user interface elements that are being displayed on the display surface, wherein the periodic change in position, state or function that occurs as a result of the continuous asynchronous re-ranking in response to user input occurs prior to the point in time when the object is determined to be within the threshold distance of the determined likely contact point on the display surface;
- once the object is within the threshold distance, without rearranging the identified subset of transient interface elements, pausing the identified subset of the separately selectable transient user interface elements so that they do not change position, state, or function, wherein the paused separately selectable transient user elements are located within a determined distance of the likely contact point, and wherein the paused separately selectable transient user interface elements are paused for a specified time to allow a selection of at least one of the one or more paused separately selectable transient user interface elements in response to the user gesture; and
- unpausing the paused transient user interface elements at the end of the specified time in the event no selection is made for any of the paused separately selectable transient user interface elements.

16. The computer program product of claim 15, wherein the paused separately selectable transient user interface elements are paused by an operating system running on the computer system.

17. The computer program product of claim 15, wherein pausing the some but not all separately selectable transient user interface elements for the specified time comprises pausing the some but not all separately selectable transient user interface elements until a specified event occurs, after which the paused transient user interface elements are unpaused upon the occurrence of the specified event.

18. The computer program product of claim 15, wherein the current trajectory of the object is determined by identifying change between x-axis coordinates, y-axis coordinates and z-axis coordinates over time.

19. The computer program product of claim 18, wherein the display surface comprises a capacitance-based touchscreen, and wherein the z-axis coordinates are determined by detecting changes in capacitance on the display surface.

20. The computer program product of claim 15, wherein the likelihood of the contact point where the object will contact the display surface increases or decreases depending on whether the current trajectory is within or is outside of a specified range.

21. The computer program product of claim 20, wherein the threshold distance is lengthened if the current trajectory indicates the object is moving slowly toward the display, and wherein the threshold distance is shortened if the current trajectory indicates the object is moving more rapidly toward the display.

* * * * *